_United States Patent_ [19]

Bergh, Sr. et al.

[11] Patent Number: 4,882,045

[45] Date of Patent: Nov. 21, 1989

[54] DISPERSAL APPARATUS WITH ROTATION VALVING

[76] Inventors: Robert J. Bergh, Sr.; Robert J. Bergh, Jr., both of 923 N. Park St., Fergus Falls, Minn. 56537

[21] Appl. No.: 233,559

[22] Filed: Aug. 18, 1988

Related U.S. Application Data

[63] Continuation of Ser. No. 894,683, Aug. 8, 1986, abandoned.

[51] Int. Cl.⁴ .............................................. B01D 35/02
[52] U.S. Cl. ...................................... 210/86; 210/104; 210/121; 210/170; 210/423; 210/424; 210/430
[58] Field of Search .......... 137/236 R, 625.11, 625.15, 137/625.16, 236.1; 210/86, 104, 121, 420, 421, 422, 423, 428, 170, 424, 430

[56] References Cited

U.S. PATENT DOCUMENTS

| | | | |
|---|---|---|---|
| 3,707,991 | 1/1973 | Shapiro | 137/625.11 |
| 4,032,451 | 6/1977 | Rosaen | 210/130 |
| 4,508,621 | 4/1985 | Jackson | 210/86 |
| 4,614,584 | 9/1986 | Di Duca | 210/422 |

Primary Examiner—Richard V. Fisher
Assistant Examiner—Wanda L. Millard
Attorney, Agent, or Firm—Lawrence M. Nawrocki

[57] ABSTRACT

A device (10) for filtering and directing effluent to one of a plurality of angularly spaced drainfield trenches. The device (10) includes a housing (12) in which a core (14) is received. A filter medium (18) is inserted within the core (14) and extends around an inside of the core (14). Effluent channelled into the core (14) passes outwardly therefrom through a port (52) formed therein. This port is in registration with one of a plurality of ports (54) formed in the housing (12). Selective registration is accomplished by rotating the core (14) relative to the housing (12).

7 Claims, 1 Drawing Sheet

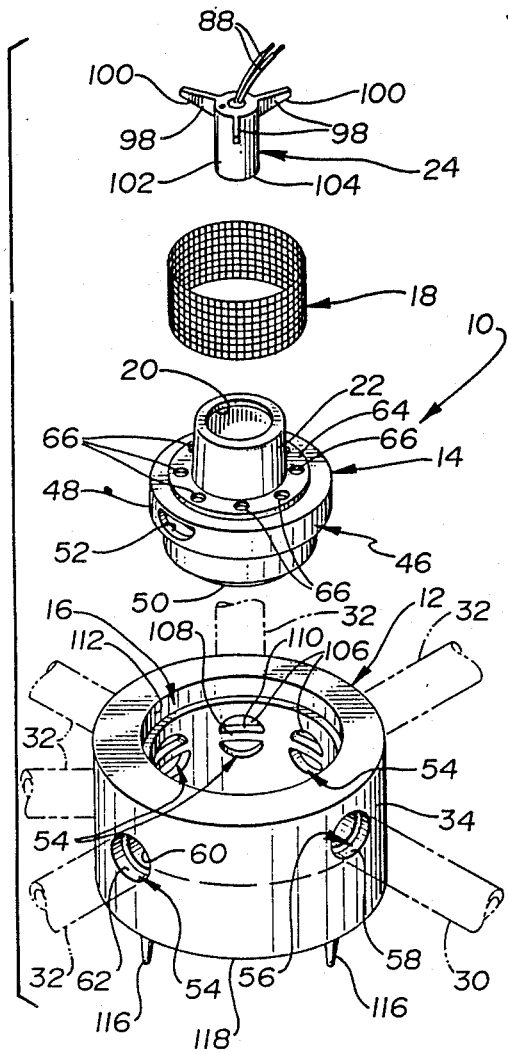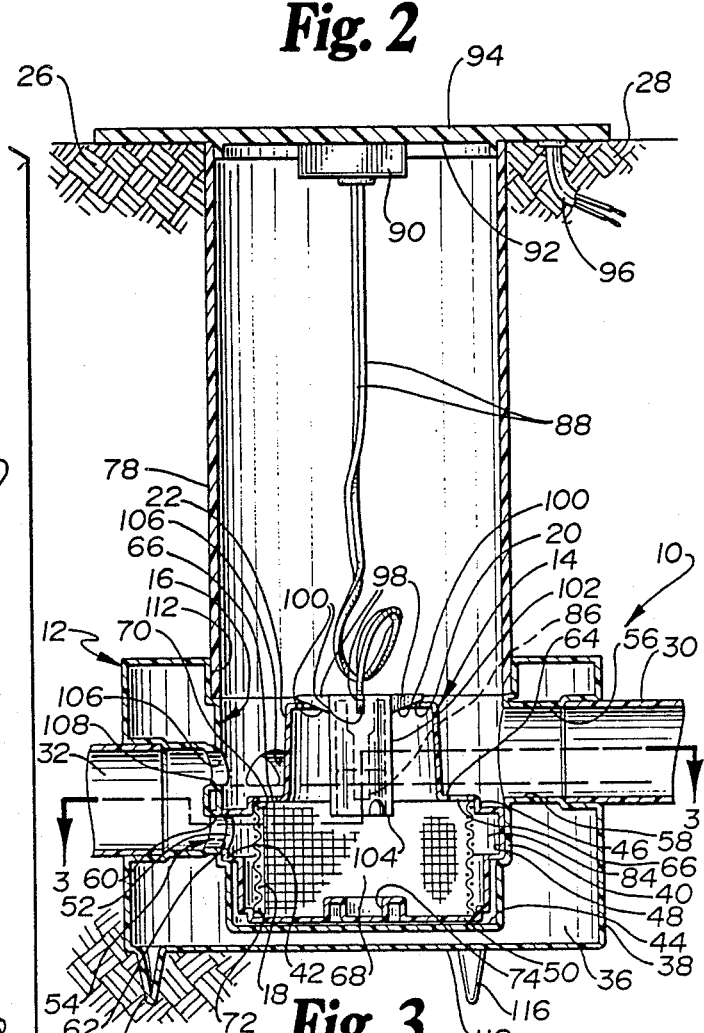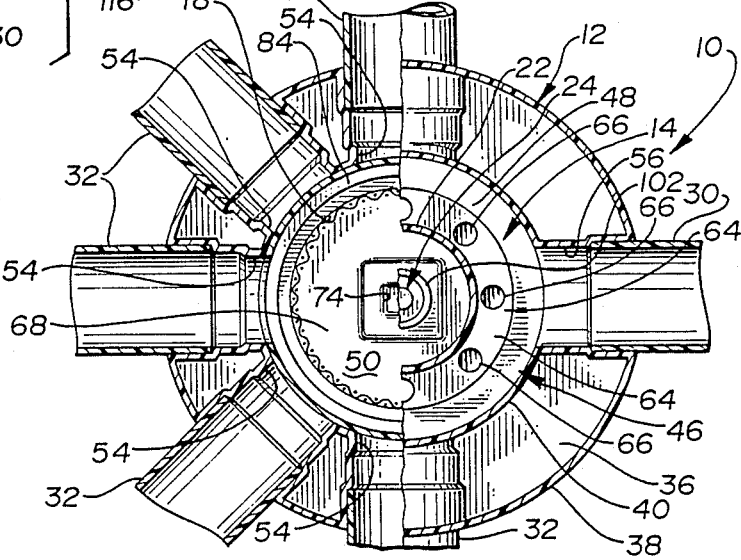

DISPERSAL APPARATUS WITH ROTATION VALVING

This is a continuation of copending application Ser. No. 894,683 Filed Aug. 8, 1986, now abandoned.

TECHNICAL FIELD

The present invention is related broadly to the field of sewage treatment. More narrowly, however, the invention comprises part of the technology dealing with sewage processing from septic and aerobic tanks. Specifically, the invention deals with apparatus for filtering liquid sewage, or effluent, discharged from a sewage tank, and valving that effluent for passage to one of a plurality of outlets. A preferred embodiment of the invention employs fail-safe means for precluding sewage back-up into the building which the sewage tank services.

BACKGROUND OF THE INVENTION

The current rate of new construction, whether it be commercial buildings or residential dwellings, presents unique problems to the construction industry. Certainly, one of these problems is the provision of ready accessibility of utilities such as electricity, gas, and telephone. Often overlooked, however, and maybe more important, is the need to provide adequate and effective sewage treatment and ultimate disposal. While it is often taken for granted that no problem will be presented in providing waste treatment systems, more experienced and sophisticated construction planners recognize the essentiality of adequately integrating various considerations bearing upon such a system into their planning at a very early stage.

Typically, in urban areas, sewer systems are provided, and property owners need not individually plan for the provision of a waste treatment system. Various factors have, however, come to dictate that onsite systems be employed. These factors include, for example, the inadequacy of common sewer systems, the high cost of sewer system construction, and various political considerations. The trend is, therefore, toward such onsite systems.

Systems of this type incorporate a large receptacle into which raw sewage passes after it leaves a building which it is designed to service. This tank is constructed, typically, having a baffle arrangement to retain and store the bulk of the solids from the sewage. The capacity of the tank is, of course, limited, and, at various times in its life, it must be pumped, the solid waste being transported by, for example, a tank truck to a disposal site at some distance from the location of the residence or other building which is serviced by the particular tank.

The liquid sewage, or effluent, from the tank, after the bulk of the solids are removed therefrom, is, typically, channeled to a distribution box. Although a very high percentage of the solids are removed by the baffles in the tank and stored therein, a small amount of suspended solids remain entrained in the effluent. Typically, suspended solids in a volume of between 130 and 160 parts-per-million remain in the effluent after it leaves the sewage tank.

The distribution box, in turn, directs the effluent into a soil treatment system such as a drainfield for treatment of the effluent. Drainfield construction typically includes a perforated pipe extending laterally from the distribution box. The pipe is, in turn, surrounded by crushed rock. The rock is covered with a soil barrier, and back filling with soil to grade is effected to complete a drainfield trench.

A trench so constructed is commonly of a width of between 24 and 30 inches and to a depth of between 2 and 3 feet. The dimensional parameters of the trench will, of course, vary depending upon anticipated sewage effluent volume and the conditions of the soil in which the trench is constructed.

Effluent directed out of the distribution box passes, first, through the perforated pipe. It disperses outwardly through the perforations and into the rock surrounding the pipe. Thereafter, it settles into the soil where it is treated naturally by decomposition. Decomposition can be either an aerobic or anaerobic process. In either case, however, the biological process effects digestion of the small organic materials, bacteria, fecal matter, and nutrients in the effluent.

In older systems, onsite treatment systems employed a single drainfield trench. A problem which resulted was at least temporary saturation of a portion, if not all, of the trench. While such saturation might have been only occasional, the consequences were serious, if not catastrophic. When the soil treatment system trench became so saturated that it could no longer absorb effluent coming out of the distribution box, the effluent would back up through the distribution box and sewage tank into the home or other building which the system serviced. This consequence tends to be messy, costly, and generally frustrating to the owner of the building. As a result, many property owners would avoid finishing areas in their homes below grade because of the possibility of back-up occurring.

One solution which technology has proposed is the provision of multiple soil treatment system segments or trenches. When one segment becomes super-saturated, a valve can be manipulated to redirect the effluent to another segment. While the effluent is redirected to the alternative segment, the first segment from which the effluent has been diverted can be effecting decomposition and can be drying.

For various reasons, therefore, "resting" of a soil treatment system segment is advantageous. Not only does "resting" work to minimize the likelihood of backing-up, but it is believed that it also functions to improve the soil structure of the various fields.

For these reasons, various political subdivisions throughout the United States and other countries have mandated that two alternate trenches be provided in all onsite sewage treatment systems. In fact, in San Mateo County, CA alternation of trenches has been a county requirement since 1969.

Problems yet remain in state-of-the-art structures. For example, typically, onsite systems, even where alternative trenches are employed, utilize only two field segments. Where large volumes of effluent are processed, two segments may be insufficient to preclude backing-up.

Even if a sufficient number of field segments is provided, however, alternation among two or more is "scheduled" at regular time intervals rather than being implemented in response to conditions. As will be able to be seen, therefore, if particularly heavy usage occurs during any one of the "scheduled" periods, backing-up might still occur.

Another problem is one wherein, even if the owner of the building being serviced by a treatment system were able to know when conditions dictate rotation from one segment to another, there is an initial period when back-up could occur even before the operative field segment could be changed. No fail-safe systems are, to applicant's knowledge, available which effect diversion of the effluent away from the conduit interconnecting the sewage tank and distribution box.

A number of other problems exist in such systems. While it is not desirable to permit large solids to pass into the perforated pipes of the treatment systems exiting from the distribution box, since the perforations could become occluded by such solids, the passage of some small solids suspended in the effluent into the soil treatment system trenches further decomposes in the soil treatment system.

Additionally, distribution boxes need to be durable in view of the corrosive and pressure environments to which they are exposed. Because of the depths to which they are planted, significant pressures can be exerted thereon.

It is to these problems in the prior art and desirable features dictated in view of those problems that the present invention is directed. It is an improved apparatus for filtering and valving the effluent from a sewage tank to one or more soil treatment system segments.

SUMMARY OF THE INVENTION

The present invention is a dispersal device for filtering and valving effluent discharged from a sewage tank through an egress conduit exiting the tank. The device comprises a housing which includes a generally cylindrical wall. An axial end of the housing defines a plane which, when the device is buried beneath the ground, is disposed generally horizontally. An inlet port, matable with the egress conduit from the sewage tank, is formed in the cylindrical wall of the housing, as are a plurality of circumferentially spaced outlet ports. The outlet ports are spaced axially downwardly from the inlet port, and each of the outlet ports is matable with a conduit leading to, or forming a part of, a discrete soil treatment system segment or trench. A core having a generally cylindrical side wall is received within the housing for rotation therewithin. A port, registrable with each of the housing outlet ports is formed in the generally cylindrical wall of the core. An upper, apertured surface of the core is disposed, when the core is operably received within the housing, at an axial location at least as low as a bottom lip of the inlet port to the housing. A filter medium overlying the generally cylindrical side wall of the core is provided to screen effluent passing through the port in the core's side wall. Means are provided for sensing effluent back-up within the core. The rising of effluent within the core is sensed at a height proximate the bottom lip of the inlet port.

In a preferred embodiment of the invention, the wall of the housing can be provided with a plurality of overflow ports. These ports can be positioned at an axial location above the upper, apertured surface of the core, when the core is operatively received within the housing. In the preferred embodiment, each overflow port is axially aligned with a corresponding outlet port in the housing and sufficiently proximate its corresponding outlet port so that it is in registration with the drainfield trench conduit with which its corresponding outlet port is associated. Overflow effluent passing through any overflow port or ports will, therefore, pass into the drainfield trenches.

An embodiment of the invention can incorporate a housing of multi-wall construction, and space between the walls can be filled with weighting material. By so structuring the housing, it is more impervious to damage which might result because of pressures brought to bear on it, and it can be better anchored.

A filter medium having an appropriate measure of coarseness can be selected. The coarseness would be chosen so that suspended solids no greater than a desired size entrained in the effluent could pass therethrough, while, at the same time, precluding passage of large solids. The integrity of the soil treatment segments can, thereby, be preserved.

In the preferred embodiment, a float switch can be provided to sense the rising of effluent within the core. Typically, the switch would be positioned at a height axially proximate the bottom lip of the inlet port to the housing.

An alarm can be incorporated into the system to be actuated in response to the sensing of a rising effluent level by the float switch. As effluent rises, in response to either a saturated drainfield trench or occlusion of the filter medium, the alarm can alert the owner of the home or other building which the system is designed to service of an impending undesirable condition.

The present invention is, thus, an improved filtering and valving structure through which liquid effluent from a sewage tank passes prior to entering one of a plurality of soil treatment trenches. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 1 is an exploded pictorial view of the major components of a device in accordance with the present invention;

FIG. 2 is a side-sectional view taken vertically on the central axis of the device of FIG. 1 and orthologically to the axis of the egress conduit from a sewage tank;

FIG. 3 is a top plan sectional view taken generally along line 3—3 of FIG. 2;

DETAILED DESCRIPTION OF THE PREFERRED EMBODIMENT

Figures 4, 5:
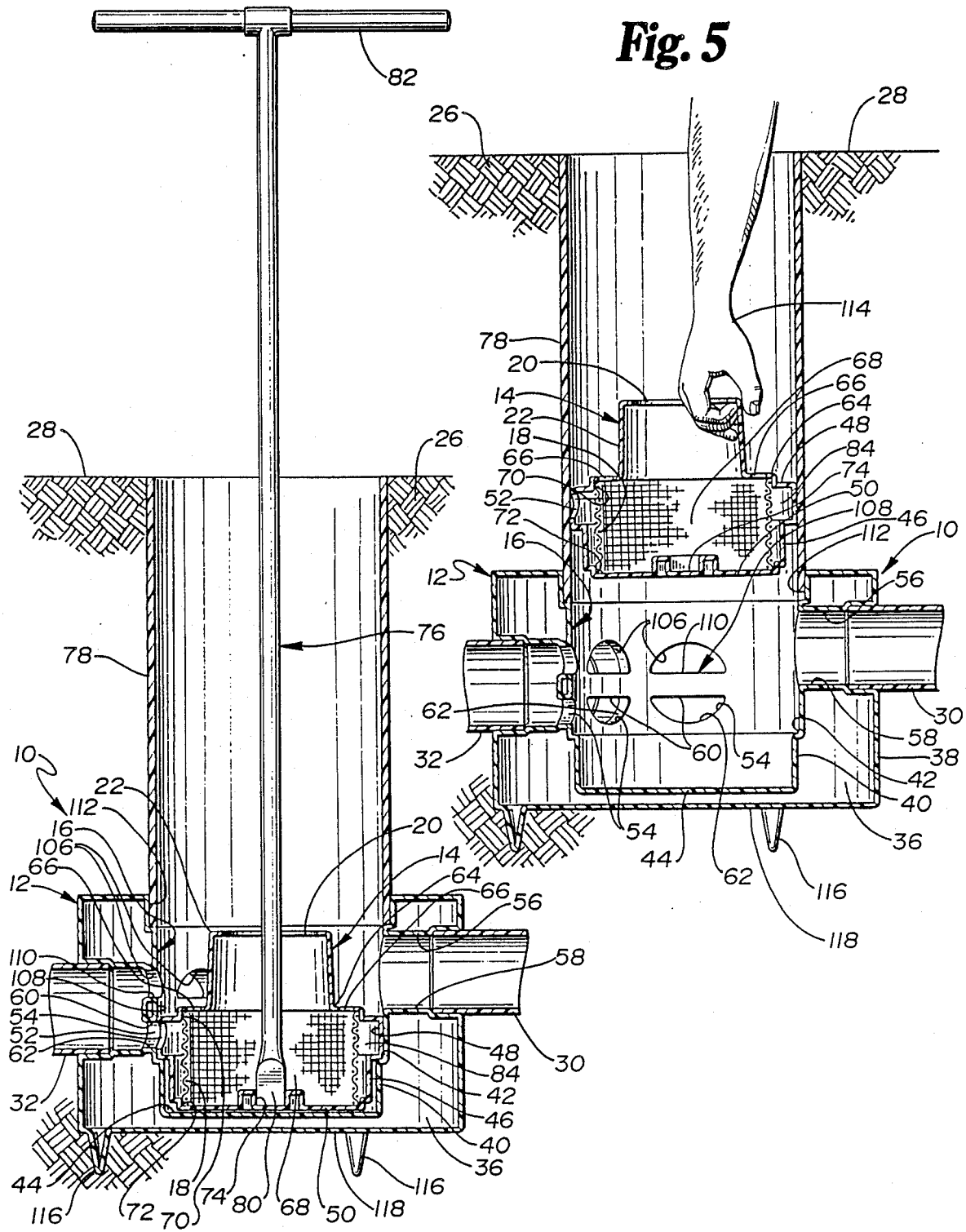
FIG. 4 is a view similar to that of FIG. 2 with some elements removed and a tool for rotating the core illustrated.
FIG. 5 is a view similar to that of FIG.4 with the tool omitted and illustrating manual removal of the core for servicing.

Referring now to the drawings wherein like reference numerals denote like elements throughout the several views, FIG. 1 illustrates the various components of an overall device 10 in accordance with the present invention. The device 10 includes a housing 12, a core 14 receivable within a central generally cylindrical cavity 16 in the housing 12, a flexible filter medium 18 coilable for insertion through a central aperture 20 in an upwardly extending portion 22 of the core 14, and a sensor 24 which, when the device 10 in accordance with the invention is positioned in the ground 26 at a distance below the surface 28 thereof, is suspended downwardly through the central aperture 20 in the upwardly extending portion 22 of the core 14.

FIG. 1 illustrates, in phantom, an egress conduit 30 through which liquid sewage, or effluent, from a sewage tank (not shown) is channeled to the housing 12. Additionally, FIG. 1 illustrates, again in phantom, a plurality of outlet conduits 32 extending radially from an outwardly facing wall 34 of the housing 12 in directions angularly spaced from one another and from the sewage tank effluent egress conduit 30. In the preferred embodiment illustrated in the figures, five of such conduits 32 are employed. The center of the conduits 32 is angled at 180 degrees from the sewage tank egress conduit 30, and two of such conduits 32 are angularly spaced at increments of 45 degrees on either side of the central conduit 30.

It will be understood that numbers of conduits 32 greater and less than five are contemplated. For example, if seven conduits 32 were incorporated into the device 10, one additional conduit 32 could be positioned on either side of the axis along which the sewage tank egress conduit 30 and center of the outlet conduits 32 are aligned. It is envisioned that, typically, an odd number of outlet conduits 32 would be employed, one centered on the sewage tank egress conduit axis and an equal number straddling the axis along which the sewage tank egress conduit 30 and central of the outlet conduits 32 are aligned. It is envisioned that the angles at which the outlet conduits 32 are spaced from one another would be equal.

As best seen in FIGS. 2, 4, and 5, the housing 12 can be multi-walled in construction. A double wall is illustrated. By so structuring the housing 12, it can be provided with strength and durability to withstand adverse environmental conditions under which it operates. Additionally, a plenum 36 can be defined between the double walls 38, 40 and filled with a weighting material (not shown) to make the device 10 better able to be anchored. It is envisioned that the housing 12 be formed by molding it from a material such as a high density polymer or other plastics.

Referring now to FIG. 2, the inner wall 40 of the housing 12 is generally circularly cylindrical and has a step 42 defined therein. The generally cylindrical inner wall 40, together with a generally planar lower wall 44 associated therewith, defines the cavity 16 in which the core 14 can be received.

The core 14 has a generally circularly cylindrical outer wall 46 with an annular, radially expanded portion 48. The diameter of the radially expanded portion is closely proximate the inner diameter of the inner generally cylindrical wall 40 of the housing 12, above the step 42. The step 42 defined in the inner wall 40 of the housing 12 forms a seat on which the expanded portion 48 of the core generally cylindrical wall 46 can be received. With the core 14 seated with the expanded portion 48 engaging the step 42, a bottom panel 50 of the core 14 is maintained slightly above the floor 44 of the cavity 16 formed in the housing 12.

As seen particularly in FIG. 1, the core expanded portion 48 is provided with a single port 52. The port 52 is selectively registrable with each of a plurality of outlet ports 54 formed in the housing inner generally cylindrical wall 40. The outlet ports 54, in turn, communicate with the respective outlet conduits 32 leading to corresponding drainfield trenches (not shown).

As seen in FIGS. 2, 4, and 5, the outlet ports 54 are sized to provide access from the cavity 16 in the housing 12 to only lower portions of corresponding outlet conduits 32. The port 52 in the expanded portion 48 of the core 14 is sized and shaped similar to these outlet ports 54 in the housing 12. As best seen in FIG. 1, the ports 52, 54 are quasi-semi-circular in shape.

An inlet port 56 in the housing 12 can be mated with the egress conduit 30 from the sewage tank. A bottom lip 58 of the inlet port 56 is, as best seen in FIG. 2, at an axial location higher than an upper edge 60 of each outlet port 54. This distance is, however, relatively small since the vertical distance from the bottom lip 58 of the inlet port 56 to the bottom lips 62 of the outlet ports 54 should not be greater than 1.5 inches. This is to comply with typical code requirements for the distance effluent will drop from the time it enters the housing 12 to when it exits.

The core 14 has an upper wall 64 that is shown as being disposed at an axial location proximate that of the bottom lip 58 of the housing inlet port 56. It is, therefore, slightly above the upper edges 60 of the outlet ports 54.

As best seen in FIGS. 1 and 3, this upper wall 64 is apertured as at 66 to provide fluid communication between that portion of the cavity 16 in the housing 12 above the upper wall 64 of the core 14, and the interior 68 of the core 14. Effluent entering the housing 12 through the inlet port 56 will, therefore, be able to enter the interior 68 of the core 14 through these apertures 66.

As previously discussed, a flexible filter medium 18 can be tightly coiled and inserted through a central aperture 20 in the upwardly extending portion 22 of the core 14. The medium 18 is provided with an axial dimension such that, once inserted into the core 14 and allowed to expand, it will be received within the core 14 between the upper, apertured wall 64 and the bottom panel 50.

The circumferential dimension of the filter medium 18 would, of course, be sufficient so that it would extend completely around the core 14. A portion of the medium 18 would, therefore, overlie the port 52 in the expanded portion 48 of the core 14. The overlying portion of the filter medium 18 would, however, be spaced radially inwardly from the port 52 in the core 14. This is so since the core 14 has the expanded portion 48 thereof and, in any case, radially outward expansion of the medium 18 is limited by annular upper and lower shoulders 70, 72.

As previously discussed in this document, most solid sewage is retained in the sewage tank. Small amounts of suspended solids are, typically, however, entrained in the effluent as it passes into the housing 12. It is, of course, undesirable for larger solids to pass into the soil treatment trenches. Bacteria present in smaller particles, however, can foster decomposition and can, therefore, be permitted to pass through the filter medium 18. An appropriately structured medium 18 is, therefore, selected to facilitate this desired filtration.

As previously indicated, the port 52 in the expanded portion 48 of the core 14 is able to be registered with each of a plurality of outlet ports 54 in the housing inner generally cylindrical wall 40. When the core port 52 is registered with one of the outlet ports 54, the other outlet ports 54 are occluded by the wall of the expanded portion 48 of the core 14. The axial position of the port 52 in the core 14, when the core 14 is in position with the expanded portion 48 seated on the step 42 defined in the housing inner generally cylindrical wall 40, is substantially the same as the axial positions of the outlet ports 54 in the housing inner wall 40. Rotation of the core 14 will, therefore, effect transition of the flow path of effluent from one soil treatment system segment conduit 32 to another.

In order to facilitate rotation of the core 14 being accomplished, the panel 50 of the core 14 can be provided with a socket 74. FIG. 3 illustrates this socket 74 as being substantially square.

FIG. 4 illustrates an elongated tool 76 which can be extended downwardly beneath the ground surface 28 through an access riser pipe 78 providing accessibility to the device 10, and through the central aperture 20 in the upward extension 22 of the core 14. A square fitting 80 at the end of the tool 78 can be inserted in the socket 74 formed in the bottom panel 50 of the core 14. A handle 82 can be provided transversely at the upper end of the tool 76 to facilitate rotation.

As will be able to be seen then, in view of this disclosure, effluent from a sewage tank will pass through the egress conduit 30 exiting the tank, through an inlet port 56 into the housing 12, into the cavity 16 in the housing 12 above the core 14, through the apertures 66 in the upper wall 64 of the core 14, into the interior 68 of the core 14, through the filter medium 18 around its periphery, and into the annular space 84 defined by the expanded portion 48 of the core generally cylindrical wall 46, through the port 52 in the expanded portion 48 of the wall 46 of the core 14, through the one particular outlet port 54 in the housing 12 with which the core port 52 is in registration, and through the related outlet conduit 32 leading to its respective soil treatment system trench. Effluent passage in a radial direction within the core 14 will tend to approximate the direction in which it moved through the sewage tank egress conduit 30, the effluent maintaining a certain measure of momentum. The maximum build-up of solids filtered by the medium 18 will, therefore, be at a location on the medium 18 diametrically opposite that portion of the medium 18 immediately beneath the tank egress conduit 30. Since the filter medium 18 rotates with the core 14, however, the location of maximum filtered solids will vary as the core 14 is rotated from one position to another. It will be understood, however, that, virtually at all times, effluent will pass through the filter screen 18 throughout 360 degrees at an axial location on the screen 18 overlying the radially extended portion 48 of the core generally cylindrical wall 46.

Flow as described in the immediately preceding paragraph will be maintained as long as the ability of the particular soil treatment system segment or trench is sufficient to receive and absorb additional effluent and the filter medium 18 is not occluded. As the trench becomes saturated, however, effluent will accumulate in the outlet conduit 32 so that it will rise in the interior 68 of the core 14. As the effluent level rises, it will approach the bottom lip 58 of the inlet port 56. If the effluent level rose above that bottom lip 58 to any extent, apparent flow into the sewage tank as a result of the rising effluent level and, in turn, into the residence or other building which the system is intended to service could result.

Similarly, if the particular soil treatment system segment being utilized is still able to absorb additional effluent, but the filter medium 18 becomes sufficiently occluded so that normal flow cannot be effected, the effluent level will also rise within the core 14. Here again, back-up into the building being serviced could result.

The present invention, therefore, incorporates a sensor for ascertaining the rise of effluent level within the core 14 to a height at which back-up might start. The sensor can comprise a float switch 86 depending downwardly through the aperture 20 formed centrally within the upwardly extending portion 22 of the core 14. The float sensor 86 depends to a vertical point closely proximate the bottom lip 58 of the inlet port 56. As the effluent level rises, the float switch 86 will open a circuit of which the switch 86 is a part. The open circuit will, in turn, set off an alarm (not shown) or initiate some other sort of signal in the residence or other building.

The circuit includes wires 88 which extend downwardly from a terminal box 90 carried by an underside 92 of a cover plate 94 closing the upper end of the access pipe 78. Wiring 96 can, in turn, extend from the cover plate 94 to the building through the ground 26 or otherwise.

The float switch 86 can be suspended by providing it with a plurality of wings 98 extending radially outwardly therefrom a distance sufficient to engage the inner periphery of the circular, central aperture 20 in the upwardly extending portion 22 of the core 14. FIG. 1 illustrates a float sensor 86 assembly having three, equi-angularly spaced wings 98. It will be understood, however, that assemblies having either more or less wings 98 could be utilized.

As seen in the figures, downwardly facing surfaces of the wings 98 can be sloped as at 100 at similar angles. If the radial dimensions of the wings 98 are the same, the wings 98 will function, therefore, to center the float switch 86 on the axis of the core 14.

The sensor assembly further includes a cylindrical protective wall 102. The wall 102 is open at the bottom 104 in order to permit the rising effluent level to enter therewithin and envelope the sensor 86. The sensor 86 is, however, recessed upwardly so that the effluent will not engage it other than by a rising effluent level, and set off an alarm indicating an erroneous condition. No false alarms should, therefore, occur.

As previously discussed, if the effluent level rises within the core 14, the rising level will be sensed, and, if an alarm or other signaling means is provided within the building serviced by the system, the condition will be brought to the attention of someone in the building. It will be understood that other means for alerting an appropriate person can be employed. For example, the alarm could be patched into a building monitoring system and transmission of the signal be made by telephone patching.

In order to inhibit back-up through the sewage tank egress conduit 30 and back into the tank, fail-safe overflow ports 106 can be provided. The figures illustrate such ports 106 as being aligned axially with corresponding outlet ports 54 and spaced therefrom at a distance sufficient not only so that they are above the upper, apertured wall 64 of the core 14, but also so that they are close enough to their corresponding outlet ports 54 so that they can be in registration with the outlet conduits 32 leading to the soil treatment system segment. If a situation occurs wherein effluent rises to an imminent back-up level within the housing 12, the effluent will be able to pass through these overflow ports 106 into all of the conduits 32 leading to the soil treatment system segments.

As seen in FIG. 1, the overflow ports 106 and their corresponding outlet ports 54 can form a series of circular apertures bifurcated by an annular bead 108 extending around the inner wall 40 of the housing 12. As seen in FIG. 2, the upper edge 110 of this bead 108 is at a height slightly above the bottom lip 58 of the inlet port 56. Because of this distance being so small, however, the effluent level rising to the upper edge 110 of the bead 108 before overflowing will not be sufficient to cause any problem with back-up into the sewage tank and, in turn, to the building being serviced. It will be understood that the bead 108 can be integrally formed, by molding, with the device housing 12.

As previously discussed, the outer diameter of the expanded portion 48 of the generally cylindrical wall 46 of the core 14 closely approximates the inner diameter of the inner cylindrical wall 40 of the housing 12 at an axial location above the step seat 42. The core 14 is, therefore, able to be retracted upwardly within the housing 12 for removal.

The inner diameter of the access riser pipe 78 is similar to the inner diameter of the inner cylindrical wall 40 of the housing 12. The riser pipe 78 can, thereby, be fitted into an annular recess 112 in the inner wall 40 so that the diameter extending upwardly to the ground surface 28 is uniform.

As seen in FIG. 5, then, the owner of the building can, after having removed the cover plate 94 and sensor assembly, reach downwardly, as at 114, grab the core 14 manually, and withdraw it so that the filter medium 18 and core 14 can be cleaned. After the filter medium 18 is renewed, the core 14 can be returned to its position seated within the housing 12, and the sensor assembly and cover plate 94 repositioned.

Under certain conditions, the device in accordance with the invention might be positioned sufficiently far down within the ground 26 and the length of the access riser pipe 78 be sufficiently long so that manual grasping of the core 14 could not be achieved. Additionally, even if the housing 12 were burried to a depth of only, for example, two feet, it would be desirable to provide means for removing the core 14 without having to manually handle that component. The tool 76 previously discussed can be configured for employment in retracting the core 14. Any appropriate fittings can be provided on the tool 76 and the core 14 to enable this retraction.

Another feature of the invention which bears mentioning is structure employed for stabilizing the housing in its desired location. FIGS. 1, 2, 4, and 5 illustrate the employment of a plurality of protrusions or cleats 116 which dig into the earth surrounding the housing 12 to anchor the housing 12 to minimize movement. It is envisioned that three equi-angularly spaced cleats 116 would be employed (although more or less would also be appropriate), and that they would be disposed proximate the periphery of the housing 12 and extend from the housing's bottom wall 118.

In certain topographical conditions, the structure in accordance with the present invention might include soil treatment system segments, or trenches, that angle downwardly beneath a sloped surface of the ground 26. When the present invention is employed under such conditions, additional sensors (not shown) might be disposed at locations above respective of the trenches which angle downwardly. These sensors, as in the case of the primary sensor 86, could be suspended downwardly through peripheral access riser pipes (not shown) and wired, in series, with the common circuit to the alarm system. If saturation occurred in one of these trenches and threatened to percolate upwardly through the ground 26 to the surface 28, the peripheral sensor monitoring the particular trench would set off the alarm.

A sub-assembly of a filter medium 18 could also be employed with a conventional distribution box or analagous component of a sewage treatment system. The overflow feature would, however, be employed also in such an application.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. Dispersal apparatus for filtering and valving effluent, having suspended solids entrained therein, discharged from a sewage tank through a generally horizontally-disposed, buried egress conduit, comprising:
    (a) a housing, formed relative to an axis, defining a plane at an axial end thereof, said housing being positioned beneath the ground surface with said plane disposed generally horizontally, said housing having an enclosing wall with an inlet port formed therein, the inlet port being mated to the egress conduit, and said wall having a plurality of circumferentially spaced outlet ports, spaced axially downwardly from said inlet port, formed therein, each of said outlet ports being mated to a conduit leading to a discrete soil treatment system segment;
    (b) a core received within said housing for rotation therewithin about a generally vertically extending axis generally coinciding with said axis with respect to which said housing is formed, said core having a side wall with a port, registrable with each of said outlet ports, formed therein, and an upper, apertured wall disposed at a location at least as low as a bottom lip of said inlet port;
    (c) a filter medium overlying said side wall of said core and said port formed in said core side wall; and
    (d) means, suspended within said housing, for sensing effluent level rising within said core to a height proximate said bottom lip of said inlet port.

2. Apparatus in accordance with claim 1 further comprising means, responsive to a condition acertained by said sensing means wherein effluent is sensed as having risen to a height proximate said bottom lip of said inlet port, for actuating a signal at a monitoring location remote from said dispersal apparatus.

3. Apparatus in accordance with claim 1 wherein said sensing means comprises a float switch.

4. Apparatus in accordance with claim 1 wherein said wall of said housing has a plurality of overflow ports, disposed axially above said upper, apertured wall of said core, formed therein, each of said overflow ports being aligned, in a direction parallel to said axis with respect to which said housing is formed, with a corresponding outlet port and registered with the conduit leading to a soil treatment system segment with which its corresponding outlet port is mated.

5. Apparatus in accordance with claim 1 wherein said filter medium has a coarseness such that small suspended solids entrained in the effluent will pass therethrough, while large solids will not.

6. Apparatus in accordance with claim 1 wherein said housing is double walled.

7. Dispersal apparatus for filtering and valving effluent, having suspended solids entrained therein, discharged from a sewage tank through a generally horizontal buried egress conduit, comprising:

(a) a housing, formed relative to an axis, having generally-planar, generally horizontally disposed, upper and lower walls, and a generally-cylindrical enclosing wall with an inlet port, mated to the egress conduit, and a plurality of circumferentially-spaced outlet ports, spaced axially downward from said inlet port, formed therein, each of said outlet ports mated to a conduit leading to a discrete soil treatment system segment, said generally-cylindrical enclosing wall additionally having a plurality of overflow ports formed therein, each of said overflow ports being axially aligned, in a direction parallel to said axis with respect to which said housing is formed, with a corresponding outlet port, and being registered, along with its corresponding outlet port, with a conduit leading to a soil treatment system segment with which its corresponding outlet port is mated;

(b) a core received within said housing for rotation therewith about a generally vertically extending axis generally coinciding with said axis with respect to which said housing is formed, said core having a generally-cylindrical side wall with a port, registrable with each of said outlet ports as said core is rotated within said housing, formed therein, and an upper, apertured wall disposed at a location at least as low as a bottom lip of said inlet port and lower extremities of said overflow ports;

(c) a filter medium overlying said generally-cylindrical side wall of said core and said port formed in said core; and (d) means, suspended within said housing, for sensing effluent housing level rising within said core to a height proximate to said bottom lip of said inlet port.

* * * * *